(12) United States Patent
Miller et al.

(10) Patent No.: US 7,530,220 B2
(45) Date of Patent: May 12, 2009

(54) CONTROL STRATEGY FOR REDUCING FUEL CONSUMPTION PENALTY DUE TO NOX ADSORBER REGENERATION

(75) Inventors: Michael J. Miller, Mount Prospect, IL (US); Guoqing Zhang, Lisle, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 603 days.

(21) Appl. No.: 11/077,314

(22) Filed: Mar. 10, 2005

(65) Prior Publication Data

US 2006/0201141 A1 Sep. 14, 2006

(51) Int. Cl.
*F01N 3/00* (2006.01)

(52) U.S. Cl. .............. 60/274; 60/276; 60/285; 60/295; 60/297; 701/103; 701/107; 701/115

(58) Field of Classification Search ............ 60/274, 60/276, 277, 285, 295, 297; 701/103, 107, 701/109, 115
See application file for complete search history.

(56) References Cited

U.S. PATENT DOCUMENTS

| | | | | |
|---|---|---|---|---|
| 5,402,641 A | * | 4/1995 | Katoh et al. ............. | 60/285 |
| 5,406,790 A | * | 4/1995 | Hirota et al. ............ | 60/276 |
| 5,657,625 A | * | 8/1997 | Koga et al. ............. | 60/274 |
| 6,134,883 A | * | 10/2000 | Kato et al. ............. | 60/274 |
| 6,199,372 B1 | * | 3/2001 | Wakamoto ............. | 60/274 |
| 6,244,043 B1 | * | 6/2001 | Farmer et al. .......... | 60/274 |
| 6,370,868 B1 | * | 4/2002 | Kolmanovsky et al. ... | 60/274 |
| 6,487,851 B1 | * | 12/2002 | Okada et al. ........... | 60/285 |
| 6,915,629 B2 | * | 7/2005 | Szymkowicz ........... | 60/289 |
| 6,915,630 B2 | * | 7/2005 | Surnilla et al. .......... | 60/295 |
| 6,993,901 B2 | * | 2/2006 | Shirakawa ............. | 60/295 |
| 7,017,337 B2 | * | 3/2006 | Plote et al. ............. | 60/295 |

* cited by examiner

*Primary Examiner*—Tu M Nguyen
(74) *Attorney, Agent, or Firm*—Jack D. Nimz; Jeffrey P. Calfa

(57) ABSTRACT

A method for enabling initiation of regeneration of a NOx adsorber catalyst. While the engine is operating to propel the vehicle, data indicative of NOx adsorption efficiency of the NOx adsorber catalyst, data indicative of temperature of exhaust gas passing through the NOx adsorber catalyst, data indicative of speed of the motor vehicle, and data indicative of engine fueling are processed according to an algorithm (10) that will enable regeneration to be initiated upon concurrence of the data indicative of NOx adsorption efficiency indicating an efficiency less than a defined efficiency, of the data indicative of temperature of exhaust gas passing through the NOx adsorber catalyst indicating a temperature suitable for initiating regeneration, of the data indicative of speed of the motor vehicle indicating vehicle speed suitable for initiating regeneration, and of the data indicative of engine torque indicating engine torque suitable for initiating regeneration. Upon such concurrence, regeneration of the NOx adsorber catalyst is enabled to be initiated.

13 Claims, 1 Drawing Sheet

US 7,530,220 B2

CONTROL STRATEGY FOR REDUCING FUEL CONSUMPTION PENALTY DUE TO NOX ADSORBER REGENERATION

FIELD OF THE INVENTION

This invention relates generally to internal combustion engines that propel motor vehicles and have NOx adsorber catalysts for adsorbing NOx (oxides of nitrogen) in engine exhaust. A particular aspect of the invention relates to a control strategy for reducing the fuel consumption penalty that is associated with regeneration of the catalyst.

BACKGROUND OF THE INVENTION

Oxides of nitrogen have been identified as contributors to smog. A NOx adsorber catalyst placed in the exhaust system of an internal combustion engine can adsorb substantial amounts of oxides of nitrogen from engine exhaust passing through it so that they do not escape to the ambient atmosphere. A NOx adsorber catalyst may offer an advantage over those catalysts that are intended to be used with internal combustion engines running mainly at stoichiometric because it can allow an engine to run on a relatively leaner fuel-air mixture that renders the engine somewhat more efficient than when running at stoichiometric or richer.

As the engine operates, the NOx adsorber catalyst adsorbs more and more oxides of nitrogen and eventually must be regenerated. Generally speaking, a NOx adsorber catalyst adsorbs NOx in engine exhaust when the engine is running relatively leaner. The catalyst is regenerated by temporarily enriching the fuel-air mixture, resulting in release of the adsorbed oxides of nitrogen as gaseous nitrogen, carbon dioxide and water through catalytic aided chemical processes.

Some known methods for enriching a fuel-air mixture for regeneration of a NOx adsorber catalyst include the use of intake throttling, variable valve actuation, and external exhaust gas recirculation (EGR) in conjunction with control of engine fueling, such as by post-injection. The process may also be controlled by the use of feedback from a suitable exhaust sensor. A typical practice has been to control the rich-lean modulation of engine fueling used for NOx adsorber catalyst regeneration by means of timing functions, for example 30 seconds of lean and 3 seconds of rich.

SUMMARY OF THE INVENTION

The present invention employs a strategy that is not predicated on such timing functions. Accordingly, it is believed that the present invention can reduce the fuel economy penalty that is associated with regeneration of a NOx adsorber catalyst. The invention can accomplish this goal by inclusion of a novel algorithm, based on monitoring of catalyst efficiency, that is repeatedly executed by a processor in the engine control system.

Because of the need to monitor catalyst efficiency in some way, implementation of the invention may require additional hardware such as one or more NOx sensors. The requirement for such an additional sensor or sensors may however be eliminated by use of a virtual sensor or by a NOx estimation algorithm.

Principles of the invention can be embodied in an engine control as part of an overall engine control strategy. The creation of an engine and an operating strategy that can regenerate a NOx adsorber catalyst in conjunction with an overall control strategy, is seen to be a desirable objective because it can make the regeneration process transparent to an operator of the vehicle, requiring no special measures on his or her part, while also reducing the fuel economy penalty associated with regeneration.

A fundamental aspect of the present invention relates to a novel strategy for non-timing-function-based regeneration of a NOx adsorber catalyst in an exhaust system of an internal combustion engine, especially a compression ignition, or diesel, engine.

One general aspect of the claimed invention relates to a method for enabling initiation of regeneration of a NOx adsorber catalyst that adsorbs NOx in exhaust passing through an exhaust system of an internal combustion engine that propels a motor vehicle.

The method comprises processing, in an engine control system processor, while the engine is operating to propel the vehicle, data indicative of NOx adsorption efficiency of the NOx adsorber catalyst, data indicative of temperature of exhaust gas passing through the NOx adsorber catalyst, data indicative of speed of the motor vehicle, and data indicative of engine fueling according to an algorithm that will enable regeneration to be initiated upon concurrence of the data indicative of NOx adsorption efficiency indicating an efficiency less than a defined efficiency, of the data indicative of temperature of exhaust gas passing through the NOx adsorber catalyst indicating a temperature suitable for initiating regeneration, of the data indicative of speed of the motor vehicle indicating vehicle speed suitable for initiating regeneration, and of the data indicative of engine torque indicating engine torque suitable for initiating regeneration. Upon such concurrence, regeneration of the NOx adsorber catalyst is enabled to be initiated.

Another general aspect relates to a motor vehicle that is propelled by an engine and that performs the method just described.

The foregoing, along with further aspects, features, and advantages of the invention, will be seen in this disclosure of a presently preferred embodiment of the invention depicting the best mode contemplated at this time for carrying out the invention. This specification includes drawings, briefly described below, and contains a detailed description that will make reference to those drawings.

DESCRIPTION OF THE PREFERRED EMBODIMENT

Figure 1:
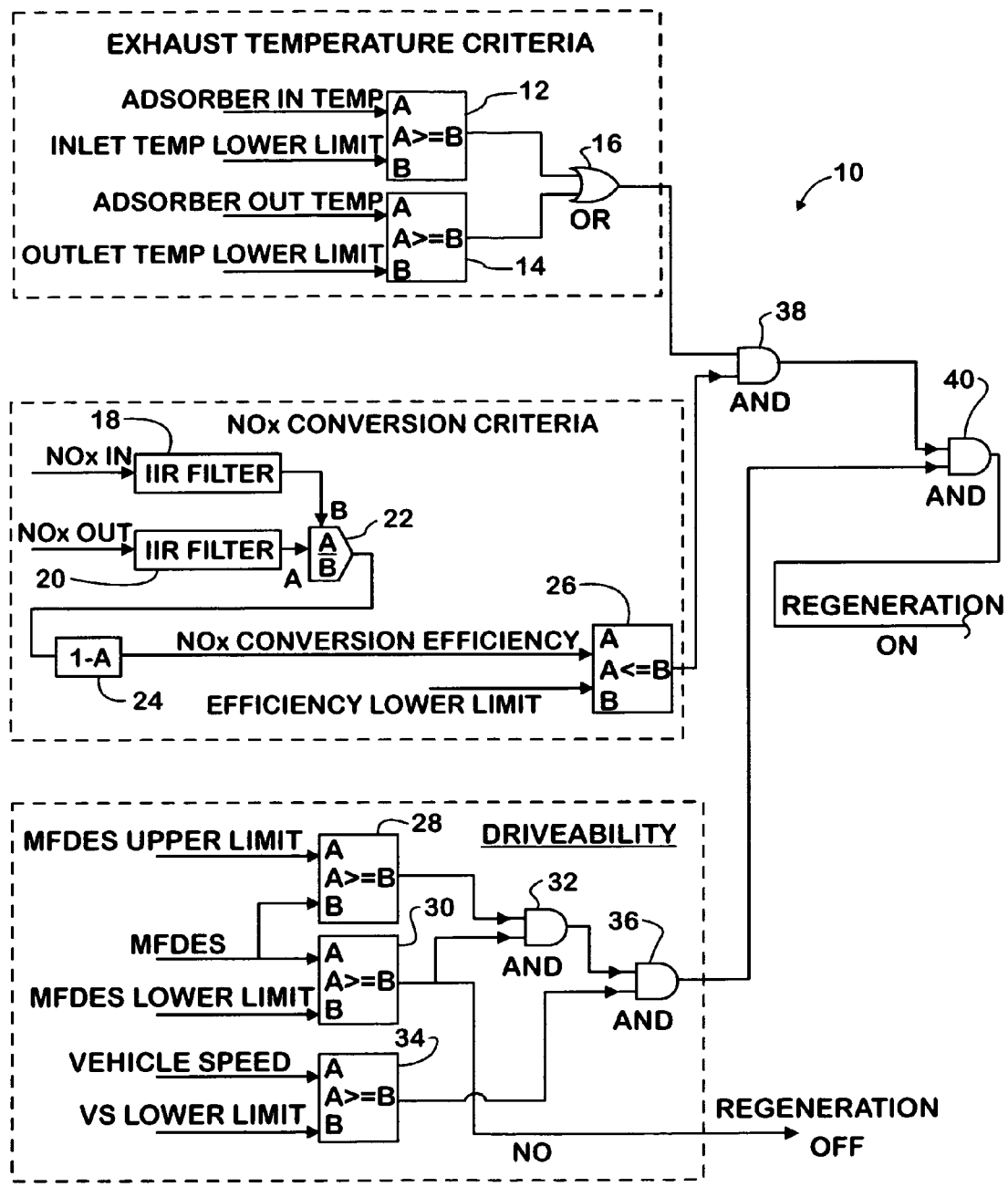
FIG. 1 is a general schematic diagram of an exemplary algorithm for practicing the invention in a motor vehicle propelled by an internal combustion engine.

FIG. 1 illustrates an exemplary algorithm 10 implemented in a processor of an engine control system associated with a multi-cylinder internal combustion engine that propels a motor vehicle. An example of such a vehicle is a truck in which the engine is a fuel-injected diesel engine operatively coupled through a drivetrain to driven wheels for propelling the vehicle.

The engine comprises an intake system through which charge air is delivered to the cylinders into which fuel is injected at proper times during the engine cycles by individual fuel injectors. The engine also comprises an exhaust system for conveyance of exhaust gases created by combustion within the engine cylinders from the engine.

The exhaust system comprises a NOx adsorber catalyst that adsorbs NOx in the exhaust flow to limit the amount that passes through to the ambient surroundings. Regeneration of the NOx adsorber catalyst is necessary in order to purge it of accumulated NOx so that it can continue to be effective. Regeneration can be accomplished by increasing the concentration of carbon monoxide (CO) passing through the catalyst, and CO concentration is itself controlled by fuel-air management techniques.

Certain data is used by algorithm 10. When used, the concentration of NOx in the exhaust entering the NOx adsorber catalyst is obtained from an upstream NOx sensor. When used, the concentration of NOx in the exhaust exiting the NOx adsorber catalyst is obtained from a downstream NOx sensor. Such NOx sensors are typically standard components of the engine system when a NOx adsorber catalyst is present. However, NOx concentration data may alternatively be gained by either a virtual sensor or by an estimation algorithm.

An upstream exhaust gas temperature sensor can provide exhaust gas temperature data for exhaust gas entering the catalyst, and a downstream exhaust gas temperature sensor can provide exhaust gas temperature data for exhaust gas exiting the catalyst. Vehicle speed data can be obtained from a data bus where it is published and frequently updated.

Engine torque is another data parameter that is utilized by the strategy. While torque can be directly measured by a torque sensor or torque estimation, other parameters are also indicative of torque in the case of a compression ignition (diesel) engine. A particular parameter used in the disclosed algorithm of FIG. 1 is desired engine fueling MFDES. Accelerator pedal position could also be used.

The engine control system contains a software operating program that implements various algorithms used for control of engine operation. Algorithm 10 is one of those algorithms.

FIG. 1 shows that the algorithm uses three criteria to determine if regeneration should be initiated: exhaust temperature criteria; NOx conversion criteria; and drivability criteria. When specified criteria are satisfied, regeneration is enabled.

The exhaust temperature criteria involves a comparison function 12 comparing the temperature of exhaust gas entering the NOx adsorber catalyst (ADSORBER IN TEMP) with a defined minimum temperature (INLET TEMP LOWER LIMIT). If the result of the comparison discloses that the temperature of exhaust gas entering the NOx adsorber catalyst is equal to or greater than the defined minimum, then function 12 provides a logic "1" output. Otherwise the output is a logic "0".

The exhaust temperature criteria also involves a comparison function 14 comparing the temperature of exhaust gas exiting the NOx adsorber catalyst (ADSORBER OUT TEMP) with a defined minimum temperature (OUTLET TEMP LOWER LIMIT). If the result of the comparison discloses that the temperature of exhaust gas exiting the NOx adsorber catalyst is equal to or greater than the defined minimum, then function 14 provides a logic "1" output. Otherwise the output is a logic "0".

An OR logic function 16 provides a "1" logic output if the output of either function 12 or function 14 is a logic "1".

The NOx conversion criteria uses NOx concentration data from the upstream NOx sensor and NOx concentration data from the downstream NOx sensor to determine NOx conversion efficiency. After filtering by respective filters 18 and 20, the respective concentration data is ratioed by a division function 22, and the ratio is subtracted from unity by a subtraction function 24 to yield a data value for NOx conversion efficiency. A comparison function 26 compares the data value for NOx conversion efficiency with a data value that defines a lower limit for the conversion efficiency. If the result of the comparison discloses that the NOx conversion efficiency is equal to or less than the lower limit, then function 26 provides a logic "1" output. Otherwise the output is a logic "0".

Drivability criteria uses several parameters in addition to the parameter MFDES. The additional parameters are an upper fueling limit MFDES UPPER LIMIT, a lower fueling limit MFDES LOWER LIMIT, speed of the motor vehicle VEHICLE SPEED, and a lower limit for motor vehicle speed VS LOWER LIMIT.

A comparison function 28 compares the data value for MFDES with the data value for MFDES UPPER LIMIT. If the result of the comparison discloses that fueling is less than the upper fueling limit, then function 28 provides a logic "1" output. Otherwise the output is a logic "0".

A comparison function 30 compares the data value for MFDES with the data value for MFDES LOWER LIMIT. If the result of the comparison discloses that fueling is equal to or greater than the lower fueling limit, then function 30 provides a logic "1" output. Otherwise the output is a logic "0".

The outputs of the two comparison functions 28, 30 are inputs to an "AND" logic function 32. When the outputs of both comparison functions 28, 30 are logic "1", the output of AND logic function 32 is also a logic "1". Otherwise, it is a logic "0".

A comparison function 34 compares the data value for the speed of the motor vehicle VEHICLE SPEED with the data value for VS LOWER LIMIT. If the result of the comparison discloses that the vehicle is traveling at a speed equal to or greater than the lower speed limit, then function 34 provides a logic "1" output. Otherwise the output is a logic "0".

The output of AND logic function 32 and the output of comparison function 34 are inputs to an AND logic function 36. When the outputs of both functions 32, 34 are logic "1", the output of AND logic function 36 is also a logic "1". Otherwise, it is a logic "0".

The output of OR logic function 16 and the output of comparison function 26 are inputs to an AND logic function 38. When the outputs of both functions 16, 26 are logic "1", the output of AND logic function 38 is also a logic "1". Otherwise, it is a logic "0".

The output of AND logic function 38 and the output of AND logic function 36 are inputs to an AND logic function 40. When the outputs of both functions 38, 36 are logic "1", the output of AND logic function 40 is also a logic "1". Otherwise, it is a logic "0".

Consequently algorithm 10 is effective to enable regeneration to be initiated upon concurrence of exhaust gas temperature passing through the NOx adsorber catalyst being suitable for initiating regeneration as determined by exhaust temperature criteria, of NOx conversion efficiency of the NOx adsorber catalyst equal to or less than the lower efficiency limit as determined by NOx conversion criteria, and of drivability compliance with vehicle speed and engine torque as determined by drivability criteria.

For reducing the risk that a single iteration of algorithm 10 might give an incorrect result, it is desirable to delay the actual initiation of regeneration until two or more successive iterations of the algorithm call for initiation of regeneration.

The regeneration process is transparent to the vehicle operator.

While a presently preferred embodiment of the invention has been illustrated and described, it should be appreciated that principles of the invention are applicable to all embodiments and uses that fall within the scope of the following claims.

What is claimed is:

1. A method for enabling and initiating regeneration of a NOx adsorber catalyst that has adsorbed NOx in exhaust gas passing through an exhaust system of an internal combustion engine that propels a motor vehicle to release adsorbed NOx by catalytic-aided chemical conversion of the NOx into other gases that entrain with flow passing out of the exhaust system, the method comprising:

processing, in an engine control system processor, while the engine is operating to propel the vehicle, data indicative of NOx adsorption efficiency of the NOx adsorber catalyst, data indicative of temperature of exhaust gas passing through the NOx adsorber catalyst, data indicative of speed of the motor vehicle, and data indicative of engine torque according to an algorithm that will enable regeneration to be initiated upon concurrence of the data indicative of NOx adsorption efficiency indicating an efficiency less than a defined efficiency, of the data indicative of temperature of exhaust gas passing through the NOx adsorber catalyst indicating a temperature suitable for initiating regeneration, of the data indicative of speed of the motor vehicle indicating vehicle speed suitable for initiating regeneration, and of the data indicative of engine torque indicating engine torque suitable for initiating regeneration;

upon such concurrence, enabling regeneration of the NOx adsorber catalyst to be initiated; and after regeneration has been enabled, initiating regeneration by increasing the amount of carbon monoxide in the exhaust gas passing through the NOx adsorber catalyst;

wherein the processor repeatedly iterates the algorithm and includes a delay function that conditions actual initiation of regeneration upon successive iterations of the algorithm disclosing such concurrence.

2. A method as set forth in claim 1 wherein the data indicative of NOx adsorption efficiency of the NOx adsorber catalyst is obtained by processing certain data according to an algorithm that estimates NOx adsorber catalyst efficiency.

3. A method as set forth in claim 1 wherein the algorithm processes data defining a minimum temperature for exhaust gas entering the NOx absorber catalyst suitable for initiating regeneration and data indicative of temperature of exhaust gas entering the NOx absorber catalyst to indicate that temperature of exhaust gas passing through the NOx absorber catalyst is suitable for initiating regeneration when the data indicative of temperature of exhaust gas entering the NOx absorber catalyst indicates exhaust gas temperature at least as high as the minimum temperature.

4. A method as set forth in claim 1 wherein the algorithm processes data defining a minimum temperature for exhaust gas exiting the NOx absorber catalyst suitable for initiating regeneration and data indicative of temperature of exhaust gas exiting the NOx absorber catalyst to indicate that temperature of exhaust gas passing through the NOx absorber catalyst is suitable for initiating regeneration when the data indicative of temperature of exhaust gas exiting the NOx absorber catalyst indicates exhaust gas temperature at least as high as the minimum temperature.

5. A method as set forth in claim 1 wherein the data indicative of NOx adsorption efficiency of the NOx adsorber catalyst is obtained by processing data from a downstream NOx sensor disposed in the exhaust system downstream of the NOx adsorber catalyst.

6. A method as set forth in claim 5 wherein the data indicative of NOx adsorption efficiency of the NOx adsorber catalyst is obtained by also processing data from an upstream NOx sensor disposed in the exhaust system upstream of the NOx adsorber catalyst.

7. A motor vehicle propelled by an internal combustion engine comprising:

an exhaust system through which products of combustion are exhausted from engine cylinders, including a Nox adsorber catalyst for adsorbing NOx in exhaust gas passing through the exhaust system to prevent NOx introduction into the ambient surroundings;

a control for controlling engine operation while the engine is operating to propel the vehicle, including controlling the initiation of NOx adsorber catalyst regeneration for releasing adsorbed NOx from the NOx adsorber catalyst by catalytic-aided chemical conversion of the NOx into other gases that entrain with flow passing out of the exhaust system, comprising a processor for processing data indicative of NOx adsorption efficiency of the NOx adsorber catalyst, data indicative of temperature of exhaust gas passing through the NOx adsorber catalyst, data indicative of speed of the motor vehicle, and data indicative of engine torque according to an algorithm that will enable regeneration to be initiated upon concurrence of the data indicative of NOx adsorption efficiency indicating less than a defined efficiency, of the data indicative of temperature of exhaust gas passing through the NOx adsorber catalyst being suitable for initiating regeneration, of the data indicative of speed of the motor vehicle indicating vehicle speed suitable for initiating regeneration, and of the data indicative of engine torque indicating engine torque suitable for initiating regeneration, upon such concurrence, enabling regeneration of the NOx adsorber catalyst to be initiated, and after regeneration has been enabled, increasing the amount of carbon monoxide in the exhaust gas passing through the NOx adsorber catalyst to initiate regeneration;

wherein the processor repeatedly iterates the algorithm and operates to delay actual initiation of regeneration until successive iterations of the algorithm disclose such concurrence.

8. A motor vehicle propelled by an internal combustion engine as set forth in claim 7 wherein data indicative of NOx adsorption efficiency of the NOx adsorber catalyst is obtained by the processor processing certain data according to an algorithm that estimates NOx adsorber catalyst efficiency.

9. A motor vehicle propelled by an internal combustion engine as set forth in claim 7 wherein the processor processes data defining a minimum temperature for exhaust gas entering the NOx absorber catalyst suitable for initiating regeneration and data indicative of temperature of exhaust gas entering the NOx absorber catalyst, and indicates that temperature of exhaust gas passing through the NOx absorber catalyst is suitable for initiating regeneration when the data indicative of temperature of exhaust gas entering the NOx absorber catalyst indicates exhaust gas temperature at least as high as the minimum temperature.

10. A motor vehicle propelled by an internal combustion engine as set forth in claim 7 wherein the processor processes data defining a minimum temperature for exhaust gas exiting the NOx absorber catalyst suitable for initiating regeneration and data indicative of temperature of exhaust gas exiting the NOx absorber catalyst, and indicates that temperature of exhaust gas passing through the NOx absorber catalyst is suitable for initiating regeneration when the data indicating temperature of exhaust gas exiting the NOx absorber catalyst indicates exhaust gas temperature at least as high as the minimum temperature.

11. A motor vehicle propelled by an internal combustion engine as set forth in claim 7 wherein the processor processes data defining a minimum vehicle speed suitable for initiating regeneration and the data indicative of speed of the motor vehicle, and indicates vehicle speed suitable for initiating regeneration when the data indicative of speed of the motor vehicle indicates vehicle speed at least as great as the minimum vehicle speed suitable for initiating regeneration.

12. A motor vehicle propelled by an internal combustion engine as set forth in claim 7 wherein data indicative of NOx adsorption efficiency of the NOx adsorber catalyst is obtained from a downstream NOx sensor disposed in the exhaust system downstream of the NOx adsorber catalyst.

13. A motor vehicle propelled by an internal combustion engine as set forth in claim 12 wherein data indicative of NOx adsorption efficiency of the NOx adsorber catalyst is obtained from an upstream NOx sensor disposed in the exhaust system upstream of the NOx adsorber catalyst.

\* \* \* \* \*